United States Patent
Aalund et al.

[19]

[11] Patent Number: 6,139,046
[45] Date of Patent: *Oct. 31, 2000

[54] STROLLER WITH IMPROVED FEATURES

[75] Inventors: Mark W. Aalund, Lakewood; William B. Stephens, Boulder, both of Colo.; Theodore Brent Freese, Gurnee, Ill.; Alan David Bengtson, Shorewood, Wis.; Cynthia R. Nelson, Longmont, Colo.; Donna K. Finney, Grand Island, N.Y.

[73] Assignee: Evenflo Company, Inc., Vandalia, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/937,719

[22] Filed: Sep. 25, 1997

Related U.S. Application Data

[63] Continuation-in-part of application No. 08/731,997, Oct. 25, 1996, Pat. No. 5,988,669.

[51] Int. Cl.[7] .................................................. B62B 1/00
[52] U.S. Cl. ........................ 280/642; 280/647; 280/650; 280/47.38
[58] Field of Search .................................. 280/642, 647, 280/644, 650, 47.38, 649, 47.4; 211/126.15

[56] References Cited

U.S. PATENT DOCUMENTS

| D. 296,540 | 7/1988 | Perego | D12/129 |
|---|---|---|---|
| D. 298,815 | 12/1988 | Kassai | D12/129 |
| D. 300,310 | 3/1989 | Kassai | D12/129 |
| D. 305,012 | 12/1989 | Bigo et al. | D12/129 |
| D. 305,013 | 12/1989 | Bigo et al. | D12/129 |
| D. 305,316 | 1/1990 | Lin | D12/129 |
| D. 305,317 | 1/1990 | Kassai | D12/129 |
| D. 307,249 | 4/1990 | Yee et al. | D12/129 |
| D. 307,250 | 4/1990 | Kassai | D12/129 |
| D. 307,879 | 5/1990 | Giambrone | D12/129 |
| D. 308,656 | 6/1990 | Takahashi et al. | D12/129 |
| D. 310,645 | 9/1990 | Julien | D12/129 |
| D. 311,363 | 10/1990 | Lin | D12/129 |
| D. 317,280 | 6/1991 | Takahashi et al. | D12/129 |
| D. 319,906 | 9/1991 | Takahashi et al. | D12/129 |
| D. 320,370 | 10/1991 | Takahashi et al. | D12/129 |
| D. 321,850 | 11/1991 | Mong-Hsing | D12/129 |
| D. 322,420 | 12/1991 | Hawkes | D12/129 |
| D. 325,550 | 4/1992 | Kato et al. | D12/129 |
| D. 328,047 | 7/1992 | Huang | D12/129 |

(List continued on next page.)

FOREIGN PATENT DOCUMENTS

| 0 258 826 | 3/1988 | European Pat. Off. | B62B 7/08 |
|---|---|---|---|
| 2139883 | 11/1984 | United Kingdom | 280/642 |

*Primary Examiner*—Brian L. Johnson
*Assistant Examiner*—James S. McClellan
*Attorney, Agent, or Firm*—Thompson, Hine & Flory LLP

[57] ABSTRACT

A stroller includes a latching mechanism for a foldable frame that is remotely actuated through a sliding actuator on an upper frame member of the stroller frame. The sliding actuator is attached via a wire to pins which can be selectively placed in or out of engagement with a notch defined on a surface associated with the lower front frame member. A seat assembly on the stroller includes a seat back which is pivotably attached to the adjacent seat portions to allow the seat back to be folded when the stroller is folded. A canopy with dual extendable visors is removably attachable to the seat assembly. The canopy can be moved pivotably to a fully forward, fully backward, or any intermediate position, and the dual extendable visors on either end thereof can be selectively retracted or extended so as to achieve the desired amount of blocking of the sun and elements as well as to provide the desired ventilation. A footrest is provided on a front side of the seat assembly which is pivotably attached thereto and can be latched in a pivoted and retracted position under the upper front edge of the seat assembly. A slidable basket assembly is provided underneath the seat assembly which has a slidable frame that, when extended, pivots a back panel of a fabric basket assembly to provide easier access to the basket when underneath the seat assembly. A detachable tray is selectively attachable to the front edge of the seating portion of the stroller.

12 Claims, 10 Drawing Sheets

U.S. PATENT DOCUMENTS

| | | | |
|---|---|---|---|
| D. 329,832 | 9/1992 | Ishikura et al. | D12/129 |
| D. 331,208 | 11/1992 | Peebles et al. | D12/129 |
| D. 335,642 | 5/1993 | Huang | D12/129 |
| D. 340,012 | 10/1993 | Azzarelli | D12/129 |
| D. 348,637 | 7/1994 | Globerman et al. | D12/129 |
| D. 352,259 | 11/1994 | Kaneko | D12/129 |
| D. 357,440 | 4/1995 | Pietra | D12/133 |
| D. 361,049 | 8/1995 | Beckman | D12/129 |
| D. 362,832 | 10/1995 | Haut et al. | D12/129 |
| D. 363,260 | 10/1995 | Huang | D12/129 |
| 3,575,461 | 4/1971 | Goldman | 296/28 |
| 3,689,099 | 9/1972 | Patterson | 280/38 |
| 3,967,342 | 7/1976 | Gehard | 16/48 |
| 4,108,468 | 8/1978 | Orlanski | 280/648 |
| 4,173,355 | 11/1979 | Perego | 280/642 |
| 4,216,974 | 8/1980 | Kassai | 280/42 |
| 4,232,897 | 11/1980 | Maclearen et al. | 297/45 |
| 4,391,453 | 7/1983 | Glaser | 280/47.4 |
| 4,428,598 | 1/1984 | Kassai | 280/644 |
| 4,542,915 | 9/1985 | Wheeler, III et al. | 280/642 |
| 4,564,212 | 1/1986 | Orlandino et al. | 280/642 |
| 4,606,550 | 8/1986 | Cone | 280/642 |
| 4,632,421 | 12/1986 | Shamie | 280/642 |
| 4,725,071 | 2/1988 | Shamie | 280/643 |
| 4,741,551 | 5/1988 | Perego | 280/642 |
| 4,762,335 | 8/1988 | Kassai | 280/649 |
| 4,763,911 | 8/1988 | Gebhard et al. | 280/642 |
| 4,763,919 | 8/1988 | Nakao et al. | 280/644 |
| 4,765,644 | 8/1988 | Bell | 280/641 |
| 4,765,645 | 8/1988 | Shamie | 280/644 |
| 4,768,795 | 9/1988 | Mar | 280/30 |
| 4,773,124 | 9/1988 | Nakao et al. | 16/35 |
| 4,779,879 | 10/1988 | Kassai | 280/47.36 |
| 4,805,928 | 2/1989 | Nakao et al. | 280/642 |
| 4,813,739 | 3/1989 | Miller | 297/184 |
| 4,817,982 | 4/1989 | Kassai | 280/642 |
| 4,819,958 | 4/1989 | Perego | 280/644 |
| 4,832,361 | 5/1989 | Nakao et al. | 280/642 |
| 4,836,573 | 6/1989 | Gebhard | 280/644 |
| 4,848,787 | 7/1989 | Kassai | 280/642 |
| 4,856,809 | 8/1989 | Kohus et al. | 280/644 |
| 4,892,237 | 1/1990 | Cabagnero | 280/650 |
| 4,906,017 | 3/1990 | Kassai | 280/642 |
| 4,915,401 | 4/1990 | Severson et al. | 280/30 |
| 4,921,270 | 5/1990 | Schoberg | 280/655.1 |
| 4,923,208 | 5/1990 | Takahashi et al. | 280/642 |
| 5,056,805 | 10/1991 | Wang | 280/47.36 |
| 5,071,146 | 12/1991 | Lewis et al. | 280/30 |
| 5,104,180 | 4/1992 | Takahashi et al. | 297/16 |
| 5,121,940 | 6/1992 | March | 280/644 |
| 5,123,767 | 6/1992 | Ishikura et al. | 403/24 |
| 5,143,398 | 9/1992 | Teng | 280/642 |
| 5,144,717 | 9/1992 | Siesholtz et al. | 16/47 |
| 5,149,115 | 9/1992 | Sampedro | 280/33.998 |
| 5,158,319 | 10/1992 | Norcia et al. | 280/643 |
| 5,167,425 | 12/1992 | Chen | 280/648 |
| 5,168,601 | 12/1992 | Liu | 16/126 |
| 5,181,735 | 1/1993 | Onishi | 280/642 |
| 5,184,835 | 2/1993 | Huang | 280/47.371 |
| 5,192,091 | 3/1993 | Liu | 280/644 |
| 5,195,770 | 3/1993 | Ishikura | 280/648 |
| 5,197,753 | 3/1993 | Liu | 280/642 |
| 5,201,535 | 4/1993 | Kato et al. | 280/30 |
| 5,203,577 | 4/1993 | Kato et al. | 280/30 |
| 5,205,577 | 4/1993 | Liu | 280/642 |
| 5,205,578 | 4/1993 | Liu | 280/642 |
| 5,205,579 | 4/1993 | Kato et al. | 280/642 |
| 5,226,554 | 7/1993 | Dauphinais | 220/402 |
| 5,230,523 | 7/1993 | Wilhelm | 280/30 |
| 5,244,228 | 9/1993 | Chiu | 280/642 |
| 5,256,025 | 10/1993 | Williamson | 414/490 |
| 5,257,799 | 11/1993 | Cone et al. | 280/642 |
| 5,382,074 | 1/1995 | Pietra | 297/153 |
| 5,417,450 | 5/1995 | Wang | 280/642 |
| 5,454,584 | 10/1995 | Haut et al. | 280/642 |
| 5,472,224 | 12/1995 | Cabagnero | 280/642 |
| 5,490,685 | 2/1996 | Kitayama et al. | 280/47.38 |
| 5,522,639 | 6/1996 | Jaime | 297/184.15 |
| 5,531,238 | 7/1996 | Azzarelli et al. | 135/66 |
| 5,590,896 | 1/1997 | Eichhorn | 280/642 |
| 5,622,377 | 4/1997 | Shamie | 280/642 |
| 5,673,924 | 10/1997 | Demick et al. | 280/30 |
| 5,709,400 | 1/1998 | Bonnier et al. | 280/650 |
| 5,833,261 | 11/1998 | Brown et al. | 280/642 |
| 5,854,916 | 12/1998 | Stroud | 280/47.38 |
| 5,876,046 | 3/1999 | Courtney et al. | 280/30 |
| 5,876,057 | 3/1999 | Huang | 280/642 |
| 5,893,577 | 4/1999 | Takahashi | 280/642 |
| 5,938,229 | 8/1999 | Chen et al. | 280/642 |
| 5,988,669 | 11/1999 | Freese et al. | 280/642 |
| 5,988,670 | 11/1999 | Song et al. | 280/642 |

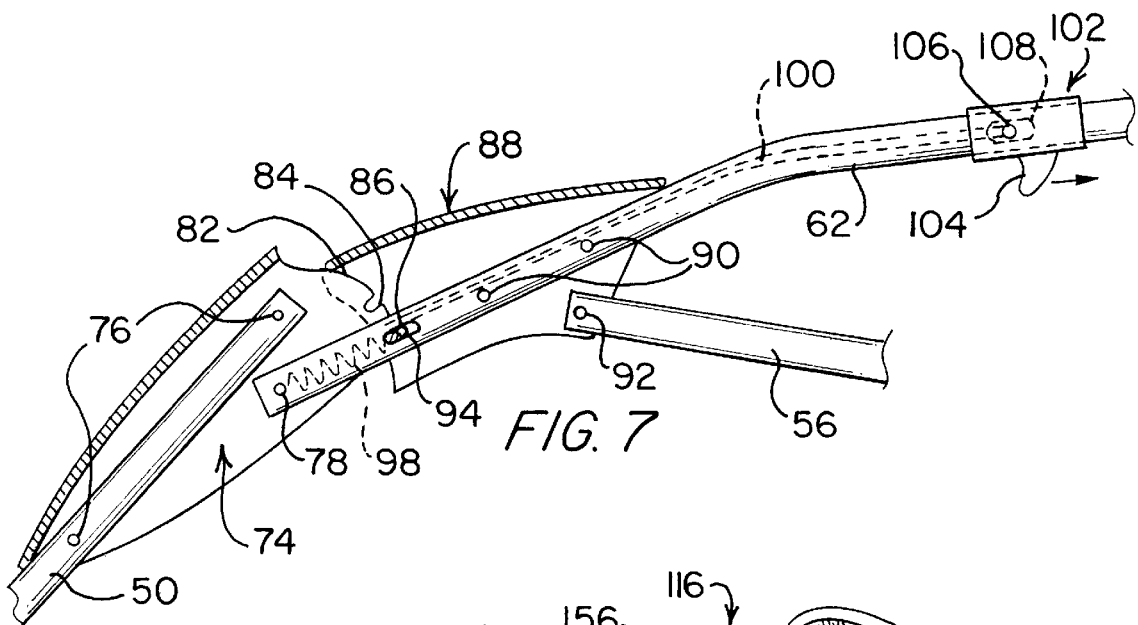
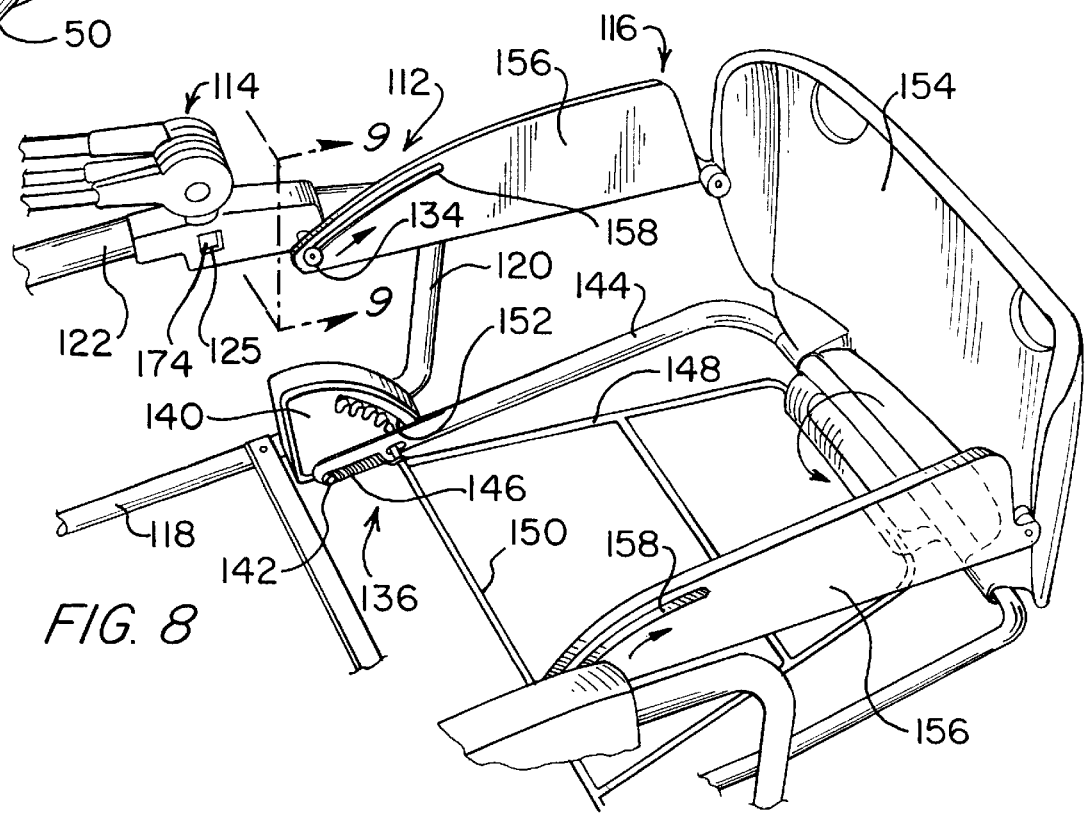
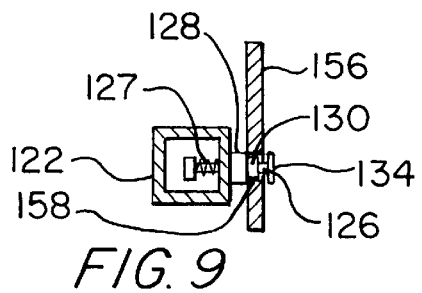
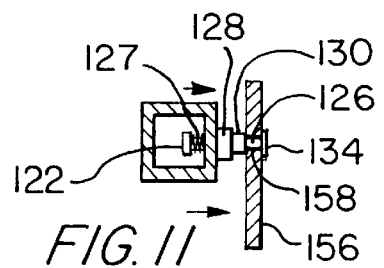

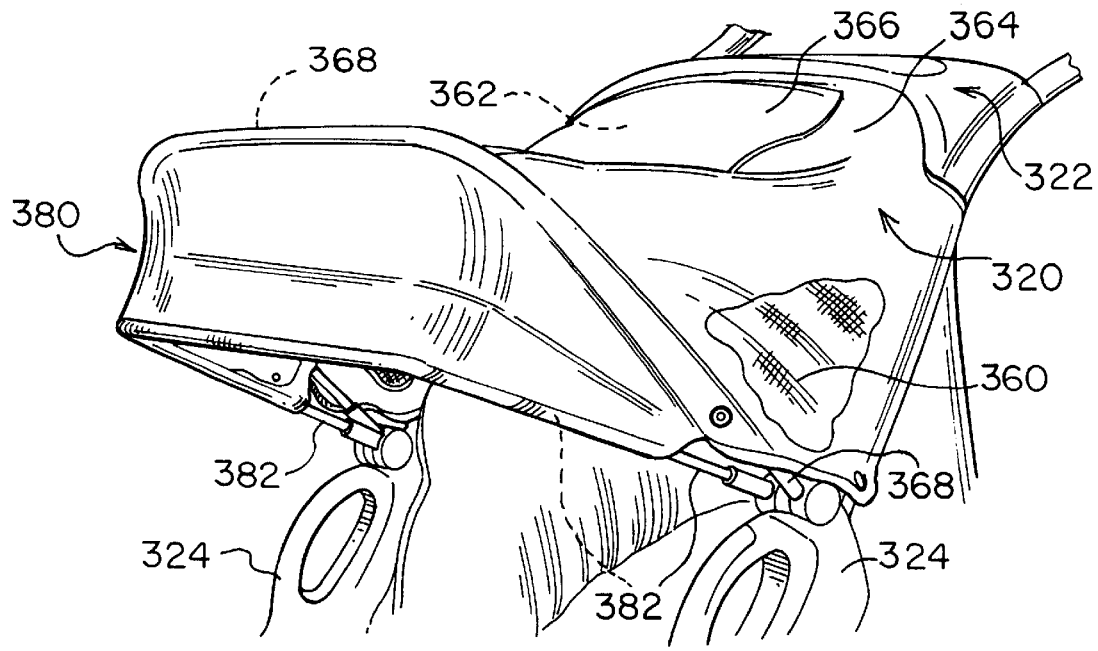
FIG. 25
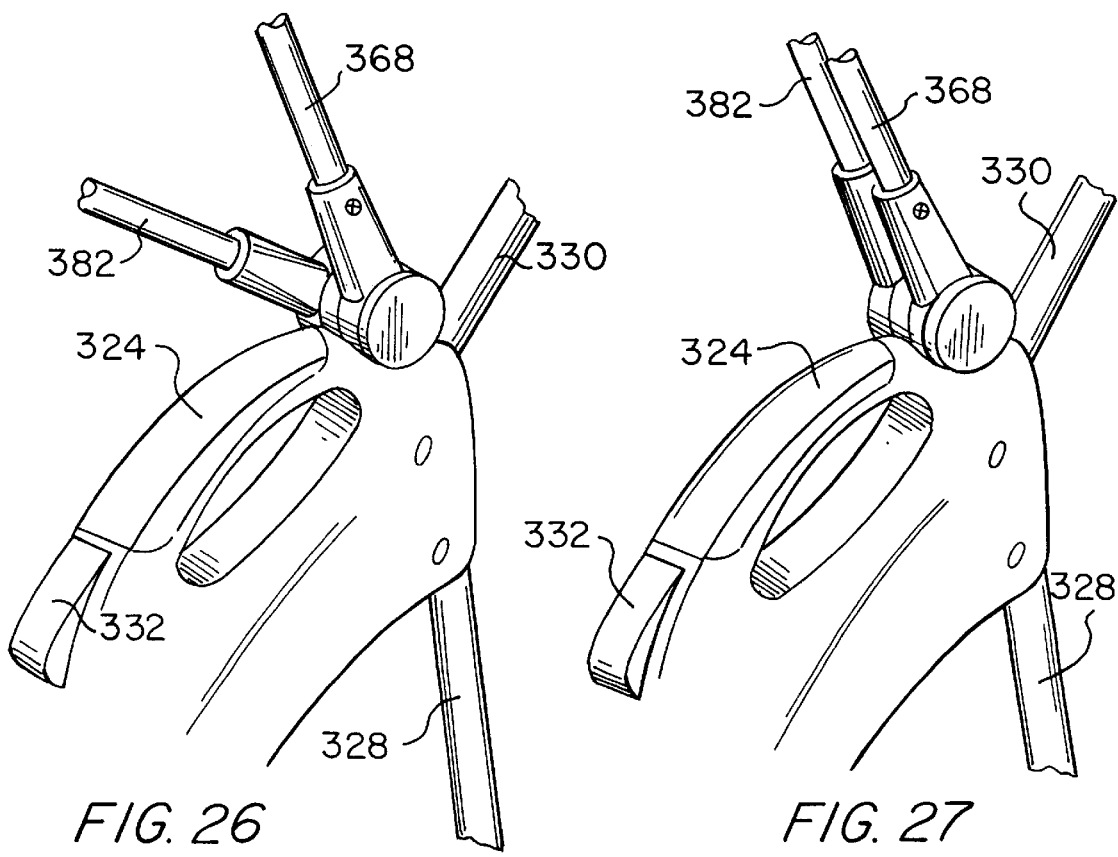
FIG. 26
FIG. 27

STROLLER WITH IMPROVED FEATURES

CROSS-REFERENCE TO OTHER APPLICATIONS

This patent application is a continuation-in-part of U.S. patent application Ser. No. 08/731,997 now U.S. Pat. No. 5,988,669, filed Oct. 25, 1996, and entitled "Improved Stroller," the contents of which are incorporated herein by reference.

BACKGROUND OF THE INVENTION

Strollers for use in transporting infants across generally horizontal surfaces are generally well-known and are disclosed in countless references. Nevertheless, various features continue to be developed for strollers relating to improved convenience, performance, safety, comfort, and so forth. Clearly, there are still improvements that can be made in the stroller art.

Most modern strollers are foldable in some manner so that they can be converted from an open (operational) configuration into a folded (storage) configuration. One area of possible improvement in such strollers is the three-dimensional volume of the stroller profile when folded. Since it is typically desirable to place the folded stroller into a car trunk, a closet, or some other storage area, it is preferable for the folded stroller to be as small as possible when folded while retaining the ability to be returned to an operational configuration without complicated reassembly of the stroller. In the area of carriage strollers, where the seating portion folds down to a completely horizontal surface or bassinet configuration, the structure and volume of the seating portion may be particularly problematic in the design of the folding operation.

Some modern strollers include a storage basket located underneath or behind the seating area of the stroller for the adult to place and store various and sundry items such as diaper packs, bottles, shopping purchases, and so forth. Unfortunately, when such baskets are placed behind the seating area they may interfere with the legs of the adult pushing the stroller. Further, in carriage strollers the basket is typically located underneath the bassinet and may not be easily accessible. U.S. Pat. No. 4,923,208 shows a pivotably mounted basket which can be pivoted between an operational configuration for the basket behind but not directly beneath the seat and a stowed configuration underneath the seat. Unfortunately, the basket can never be placed underneath the seat when it is full of various and sundry items.

Another possible area of improvement for a stroller is in the area of canopies and sunshades. While canopies in strollers typically are stitched or otherwise affixed to the back of the seating area or frame, so that they can only be extended to cover the rear portion of the seating area, there are some strollers that have provided canopies which are selectively movable to either cover the forward portion of the stroller seating area or the rearward portion of the seating area. When using the stroller on hot days, however, it may be desirable to provide both protection from the sun and increase ventilation through the seating area. Placing the canopy in the fully forward or fully backward position decreases the possible flow of air across and through the seating area. In addition, it may be desirable to provide the option for an extended canopy or sunshade to extend from the regular canopy for particular sun angles or inclement weather. Furthermore, at times it may be undesirable to have a canopy at all on the stroller.

Some modern strollers are provided with a footrest which is pivotably mounted to the front of the seating portion. The pivotable mounting can allow for adjustment of the angle of the footrest or attachment of the footrest to the seating portion. However, the only known example of a stroller with a footrest attachable to the seating portion includes a resilient latching mechanism which at times may be difficult to operate.

In addition, with the hurried lifestyles of modern day parents it may be desirable to feed infants while they are seated in a stroller. To the applicants' knowledge, they are not aware of the provision of a play or feeding surface on a stroller. This is a non-traditional use for a stroller, and is quite different from the art of high chairs where feeding surfaces are part of the main objective of the design, and of the art of swings where play surfaces are an aesthetic addition to what is basically a restraint mechanism to keep the infant in the chair.

It is against this background and the desire to solve the problems of the prior art that the present invention has been developed.

SUMMARY OF THE INVENTION

Accordingly, it is an object of the present invention to provide a foldable carriage stroller in which seating portions of the stroller are also foldable.

It is also an object of the present invention to provide a storage basket underneath the seating area of the stroller which is operational to contain various and sundry items and is easily accessible while underneath the seating area.

It is further an object of the present invention to provide a canopy for a stroller which provides protection from the sun while allowing for increased ventilation through the seating area.

It is still further an object of the present invention to provide an improved footrest latching mechanism for attaching a footrest to the front of the seating portion of a stroller.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to a stroller for transporting children along generally horizontal surfaces. The stroller includes a support frame including a seating assembly, a plurality of wheels mountable on the support frame, and a basket assembly. The basket assembly includes a slidable basket frame having a fixed frame portion mounted on the support frame and a slidable frame portion slidably attached to the fixed frame portion, the slidable frame portion being movable between a retracted position substantially underneath the seating assembly and an extended position in which the slidable frame portion has at least a portion which extends out from underneath the seating assembly. The basket assembly also includes a flexible basket suspended from the slidable frame portion to allow the basket to slide in and out relative to the support frame between a retracted position and an extended position in which the fabric basket is in an operational configuration for use in storing articles in each of the retracted and extended positions.

The stroller may also include some combination of the following features. The fixed frame portion may be mounted on the seating assembly. The slidable frame portion may include at least one slide collar on either lateral side thereof to slidably couple the slidable frame portion to the fixed frame portion. The flexible basket may include a plurality of side panels which are attachable to the basket frame, each of the side panels having a top edge, wherein at least one of the side panels is attached to the adjacent side panels by support members to allow the top edge of the one side panel to be selectively separated from the top edges of the adjacent side panels to provide access to the interior of the basket through the side thereof via an opening at least partially defined by the top edge of the one side panel and the support members.

The present invention is also directed to a stroller for transporting children along generally horizontal surfaces, the stroller including a support frame, a plurality of wheels mountable on the support frame, and a flexible basket suspended from the support frame. The flexible basket has a plurality of side panels which are attachable to the support frame, each of the side panels having a top edge. At least one of the side panels is attached to the adjacent side panels by support members to allow the top edge of the one side panel to be selectively separated from the top edges of the adjacent side panels to provide access to the interior of the basket through the side thereof via an opening at least partially defined by the top edge of the one side panel and the support members.

The stroller may also include some combination of the following features. The basket may include four side panels, a front side panel, a rear side panel, and a pair of lateral side panels, wherein the one side panel is the rear side panel. Each of the support members may include triangular panels attached along one side to the one side panel and along another side to an adjacent side panel. The flexible basket may be composed of fabric. The support members may include a stiffening member therein to substantially prevent the support member from crumpling when the top edge of the one side panel is adjacent the top edges of the adjacent side panels. The stiffening member may include a sheet of polyboard. The one side panel may be selectively attachable to the support frame by looping an upper flap on the one side panel over a portion of the support frame, wherein the upper flap can be unlooped from the support frame to separate the top edge of the one side panel from the top edges of the adjacent side panels.

The present invention is also directed to a stroller for transporting children along generally horizontal surfaces, the stroller including a support frame, a plurality of wheels mountable on the support frame, and a canopy attachable to the support frame. The canopy includes a canopy frame attachable to the support frame and a canopy fabric attached to the canopy frame. The canopy further includes a front visor attached thereto along a front edge of the canopy and a rear visor attached to the canopy along a rear edge of the canopy. Each of the front and rear visors are selectively movable between an extended position and a retracted position.

The stroller may include some combination of the following features. The front and rear visors may be composed of fabric. The front and rear visors may be frameless. The retracted position for the front and rear visors may include the visors being folded back to lay flat against the canopy fabric.

The present invention is also directed to a stroller for transporting children along generally horizontal surfaces, the stroller including a support frame, an elongated carriage seat supported by the support frame, the carriage seat having a pair of receptacles defined on opposite lateral sides thereof at intermediate positions between a front and back of the carriage seat, and a plurality of wheels mountable on the support frame. The stroller also includes a canopy removably attachable to the receptacles of the carriage seat, wherein the canopy includes a respective pair of mating members to mate with and engage the receptacles on the carriage seat.

The present invention is also directed to a stroller for transporting children along generally horizontal surfaces, the stroller including a foldable support frame, a plurality of wheels mountable on the support frame, and a child support attachable to the support frame. The child support has a fixed portion and a movable portion pivotably attached to the fixed portion to allow the child support to be placed in one of a plurality of orientations including a bassinet orientation, in which the movable portion is generally parallel to the fixed portion, and a seating orientation, in which the movable portion is pivoted to an angle where the movable portion is generally at an intersecting angle to the fixed portion. The movable portion has a rear member which is pivotably attached thereto and can be folded from an upright position to a folded position relative to the remainder of the movable portion for a reduced profile when the support frame is folded.

The stroller may include some combination of the following features. The rear member may also be attached to the fixed portion via lateral side arms pivotably connected to the rear member and slidably connected to the fixed portion. One of the fixed portion and the lateral side members may include a slot defined therein and the other of the fixed portion and the lateral side members includes a pin attached thereto for slidable engagement by the slot. The pin and slot may include surfaces thereon that substantially prevent the rear member from being folded when in the upright position until one of the pin and slot is moved relative to the other in a direction parallel to the longitudinal axis of the pin to allow the pin to be slid along the slot so that the rear member can be folded.

The present invention is also directed to a stroller for transporting children along generally horizontal surfaces, the stroller including a support frame, a plurality of wheels mountable on the support frame, a seating portion mounted on the support frame, and an article-receiving tray selectively attachable to and detachable from the seating portion.

The stroller may include some combination of the following features. One of the seating portion and the tray may include latching fingers provided thereon and the other of the seating portion and the tray includes mating surfaces defined thereon for engagement by the latching fingers. The latching fingers may be resilient and have protruding members thereon, and the mating surfaces include notches defined therein for engagement by the protruding members of the resilient fingers.

The present invention is also directed to a stroller for transporting children along generally horizontal surfaces, the stroller including a support frame, a plurality of wheels mountable on the support frame, and a seating portion mounted on the support frame, the seating portion having a pivotable button pivotably mounted on the seating portion, the button being biased downward by a spring associated therewith. The stroller also includes a footrest pivotably attached to the seating portion, the footrest being pivotable between an extended position wherein a bottom surface of the footrest is spaced apart from the seating portion and a retracted position wherein the bottom surface of the footrest is adjacent to the seating portion, the bottom surface of the footrest being attachable to the seating portion by forcing the bottom surface of the footrest against the button to cause the button to pivot against the biasing force of the spring until the bottom surface of the footrest is moved past the button, at which point the button can move back toward its biased position and retain the bottom surface of the footrest in engagement with the button until the button is forced against the bias of the spring to allow the footrest to pivot back toward its extended position under the force of gravity.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings:

FIG. 7 is a similar view to FIGS. 5 and 6, showing a pin of the latching mechanism engaging with a cam surface thereon.

FIG. 8 is a perspective view of selected components of the seating portion of the stroller of FIG. 1.

FIG. 9 is a sectional view taken along line 9—9 of FIG. 8.

FIG. 11 is a sectional view taken along line 11—11 of FIG. 10.

FIG. 25 is an enlarged perspective view of the canopy shown in FIG. 24, with a sunshade shown in an extended position;

FIG. 26 is an enlarged perspective view of a fragmentary portion of the left side of the canopy and sunshade of FIG. 25, showing a sunshade frame in an extended position relative to a canopy frame; and FIG. 27 is an enlarged perspective view similar to the view of FIG. 26, showing the sunshade frame in a retracted position relative to the canopy frame.

DETAILED DESCRIPTION OF THE PREFERRED EMBODIMENTS

Figure 1:
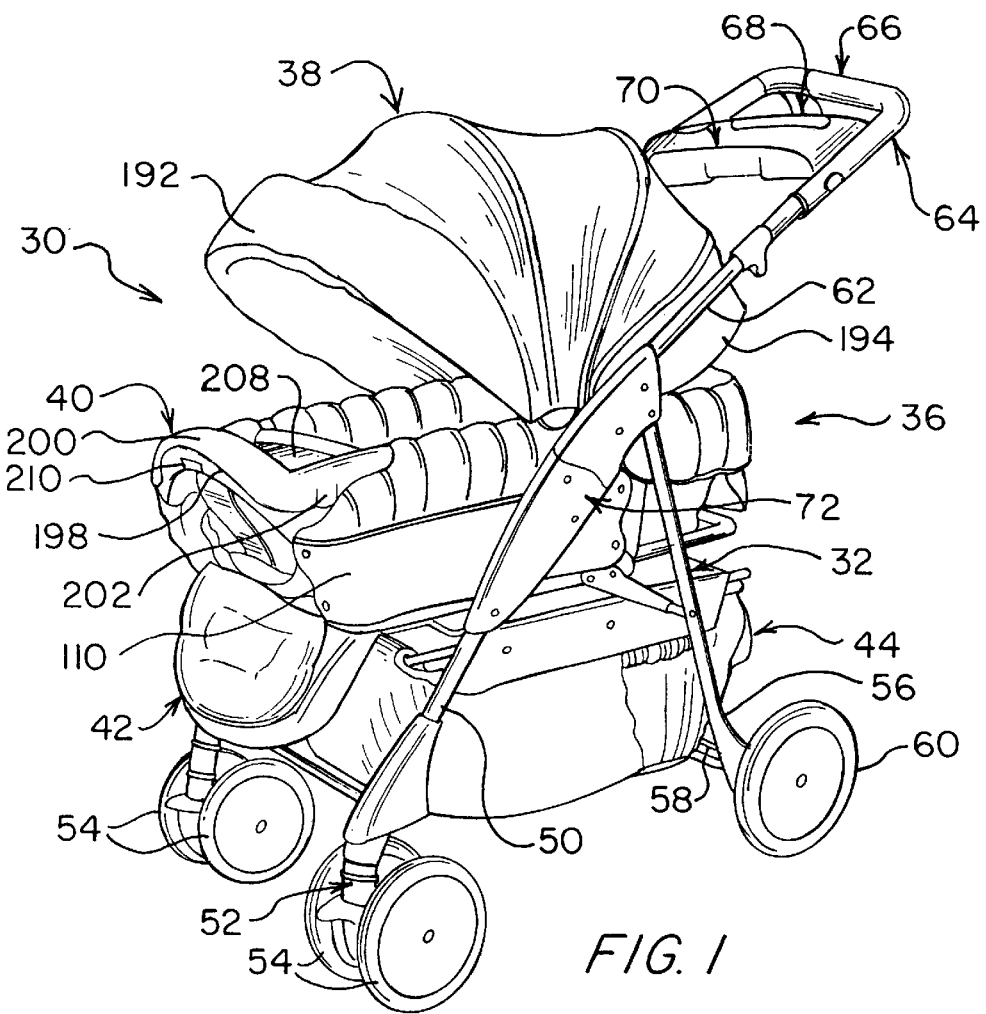
FIG. 1 is a front perspective view of a stroller of the present invention.
Figure 3:
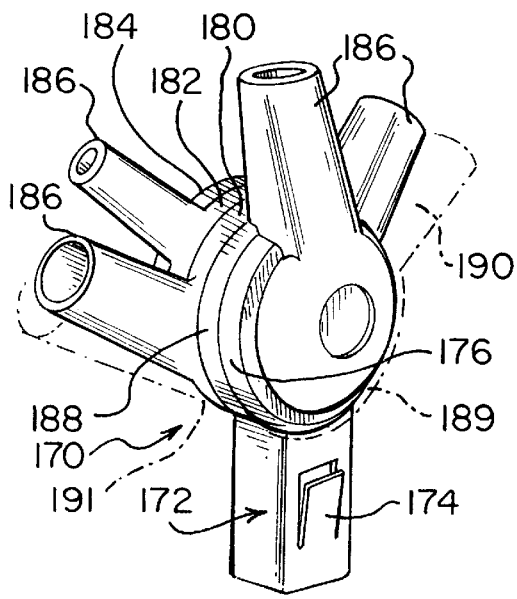
FIG. 3 is an enlarged view of a hub assembly of the canopy of FIG. 2.

A stroller 30 (FIG. 1) of the present invention includes a main support frame 32 supported on the ground by a plurality of wheels, which frame 32 supports a seat assembly 36 including a canopy 38, a tray 40, and a footrest 42. The main frame 32 and seat assembly 36 also support a storage basket assembly 44 located beneath the seat assembly 36 that can be used for storage of various and sundry items (not shown).

The main support frame 32 (FIG. 1) includes a pair of lower front frame members 50 provided with a conventional suspension device 52 on lower ends thereof with rotatable mounts for a pair of stroller wheels 54, in a conventional manner. The mounts for the front wheels 54 may also include functionality for locking the rotatable mounts so as to prevent rotation and keep the wheels 54 aligned for straight-forward movement, in a conventional manner. The main support frame 32 also includes a pair of lower rear frame members 56 rotatably attached to a rear axle 58. Provided on either ends of the axle 58 are conventional stroller wheels 60.

The main support frame 32 (FIGS. 1 and 2) also includes a pair of upper frame members 62 attached to a push handle assembly 64. The push handle assembly 64 may include a two-handed grip portion 66 and a single-handed grip portion 68. The push handle assembly 64 also includes a tray or console 70 located just forward of the grip portions 66 and 68.

Figure 6:
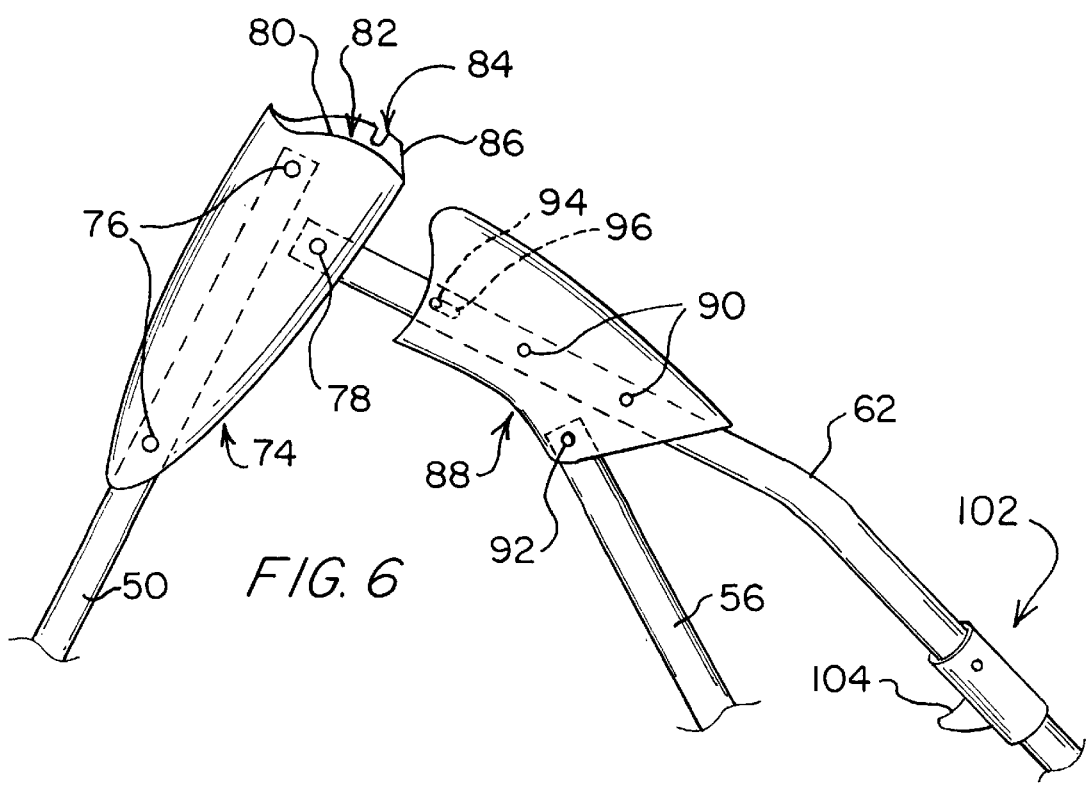
FIG. 6 is a view similar to FIG. 5, showing the frame in an unlatched configuration.

For purposes of interconnecting the frame members 50, 56, and 62 on each side of the stroller 30, a fairing assembly 72 (FIGS. 1, 2, and 5–7) is provided on each side. Because of the symmetrical design of the main support frame 32 of the stroller 30, only one side will be described with particularity. The fairing assembly 72 includes a lower fairing 74 which is fixedly attached to an upper end of each of the lower frame members 50 by a pair of rivets 76. As seen in FIGS. 6 and 7, the lower fairing 74 is pivotably attached to a lower end of the upper frame member 62 via a rivet 78. Defined along an upper edge 80 of the lower fairing 74 are a pair of spaced-apart engagement surfaces 82 which are offset from and on different planes from the outer surfaces of the lower fairing 74. The engagement surfaces 82 each include a notch 84 defined thereon. Proximate to each notch 84 is a cam surface portion 86 of each engagement surface 82. Alternatively, the engagement surfaces 82 may be provided on a separate part housed within the lower fairing 74.

The fairing assembly 72 also includes an upper fairing 88 (FIGS. 5–7) which is fixedly attached to the upper frame member 62 via rivets 90. The upper fairing 88 is pivotably attached to the lower rear frame member 56 by a rivet 92.

For purposes of latching the main support frame 32 into an open (operational) configuration, a latching mechanism is provided thereon, as shown in FIGS. 5–7 and 17. The latching mechanism includes, in part, the notches 84 defined in the lower fairing 74. The latching mechanism also includes a pin 94 extending transversely through the upper frame member 62 in the area of the member covered by the upper fairing 88. The pin 94 extends through oblong slots 96 defined on lateral sides of the upper frame member 62. The pin 94 is biased toward the lower end of the upper frame member 62 by a tension spring 98 that is mounted at one end to one of the rivets 90 and at an opposite end to the pin 94. The spring 98 serves to bias the pin 94 toward the lower end of the upper frame member 62 and thus toward one end of the oblong slots 96. The pin 94 can be pulled toward the opposite end of the slots 96 by a wire 100 located within the hollow interior of the upper frame member 62. The wire 100 is attached at one end to the pin 94 and at an opposite end to a slide actuator 102 located on a central portion of the upper frame member 62 closer to the push handle assembly 64. The slide actuator 102 includes a pin or rivet 106 therethrough which is free to travel within slots 108 defined on lateral sides of the upper frame member 62. The rivet 106 is also used to hold the slide actuator 102 onto the upper frame member 62. The slide actuator 102 includes a finger 104 extending therefrom for convenient engagement by the operator. As can be appreciated in FIG. 7, when the slide actuator 102 is moved in the direction shown by the arrow, the wire 100 pulls the pin 94 toward the upper end of the slots 96 so that the pin 94 will not be in engagement with the notches 84. At this point, the upper frame member 62 can be pivoted relative to the lower fairing 74 and upper and lower front frame members 50, as may be desired to fold the stroller 30. When it is desired to return the stroller 30 to the open or operational configuration, the main support frame 32 can be latched back into the configuration shown in FIG. 5 by pivoting the upper frame member 62 in a counter-clockwise direction as viewed in FIG. 7 until the pin 94 strikes the cam surface portion 86 (FIGS. 7 and 17) of each of the engagement surfaces 82. At this point, continued pivoting of the upper frame member 62 will cause the pin to move toward the opposite end of the slots 96 and against the bias of the spring 98 due to engagement with the cam surface portions 86. The upper frame member 62 can continue to be pivoted in this manner until it is substantially parallel with, albeit slightly offset from, the lower front frame member 50 at which point the pin 94 will be pulled into the notches 84 by the force of the tension spring 98. Of course, with a latching mechanism provided on each side of the main support frame 32, it is necessary to actuate each of the latching mechanisms to disengage them and fold the stroller 30. This prevents inadvertent folding of the stroller 30. When the stroller 30 is folded, it may be latched into this folded position with a conventional spring-loaded latching mechanism (not shown).

The seat assembly 36 includes a frame 112 (FIGS. 8 and 10) and a soft-sided fabric portion 110 (FIGS. 1 and 2) supported thereby. The frame 112 includes a fixed frame 114 pivotably attached to the main support frame 32 and a pivotable frame 116 pivotably attached to the fixed frame 114. As shown in FIG. 8, the fixed frame 114 includes on each lateral side thereof a lower frame member 118, connected to a back frame member 120, which is connected to an upper frame member 122. Each upper frame member 122 includes an opening 124 defined therein to receive a mating finger of the canopy 38 and a side opening 125 defined in each upper frame member 122 for engagement with a portion of the finger. Each upper frame member 122 also includes a spring-mounted pin 126 extending transversely in toward the interior of the fixed frame 114 and mounted with a compression spring 127 (FIGS. 9 and 11). The pins 126 on opposite sides of the fixed frame 114 are substantially aligned with each other. The pins 126 each include a head 134 provided on an end thereof. The pins 126 can be moved longitudinally in the direction of the head 134 against the bias force of the compression spring 127. An annular member 128 having a neck 130 of narrower outer diameter protruding therefrom is attached to the upper frame member 122. The pin 126 is free to slide through the annular member 128.

Figure 10:
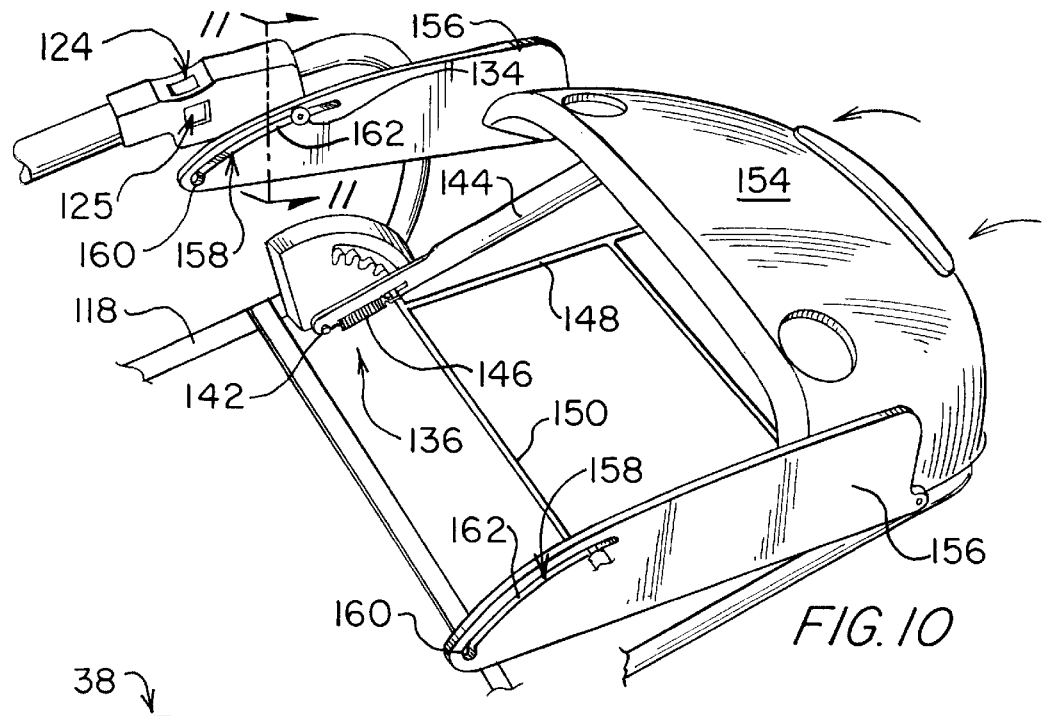
FIG. 10 is a view similar to FIG. 8, showing a seat back of the seating portion being folded relative to the remaining components of the seating portion.

The pivotable frame 116 is pivotably attached to the fixed frame 114 via a recline mechanism 136 on either side thereof, as shown in FIGS. 8 and 10. Each recline mechanism 136 includes a base 140, a pivot pin 142 that pivotably supports a pivotable frame base 144 of the pivotable frame 116 thereon, a spring 146 attached at one end to the pivot pin 142, and an actuation member 148 having a base member 150 which is received within a serrated slot 152 defined in the base 140. The spring 146 tends to pull the base member 150 into one of the serrations of the serrated slot 152 and prevent further pivotable movement of the pivotable frame base 144 relative to the base 140. When the actuation member 148 is pulled against the force of the spring away from the pivot pin 142, the base member 150 is able to move arcuately in the serrated slot 152 so that the pivotable frame 116 can be placed into a different angular position relative to the fixed frame.

Figure 12:
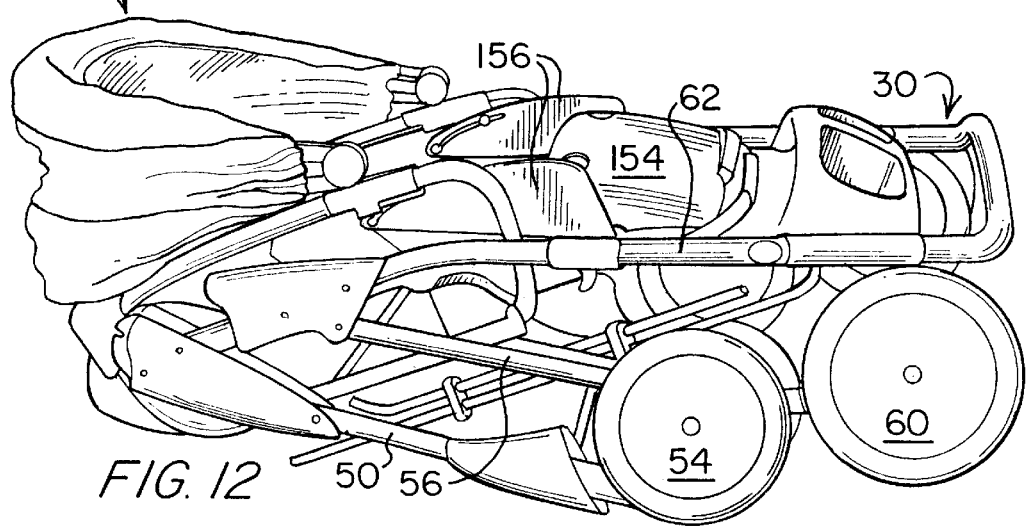
FIG. 12 is a side elevational view of the stroller of FIG. 2 after it has been folded to the storage configuration.
Figure 13:
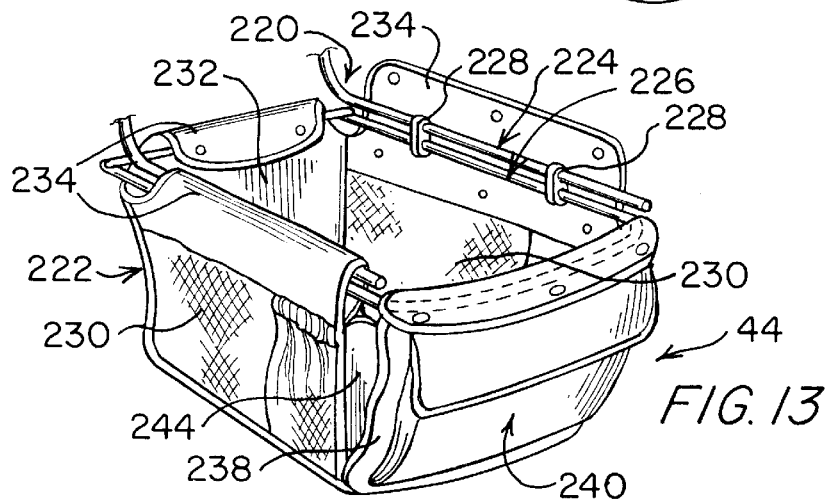
FIG. 13 is a rear perspective view of a storage basket located underneath the seating portion of the stroller of FIG. 1, showing one of the side panels detached to expose the frame supporting the basket, and showing the basket in a retracted configuration.
Figure 14:
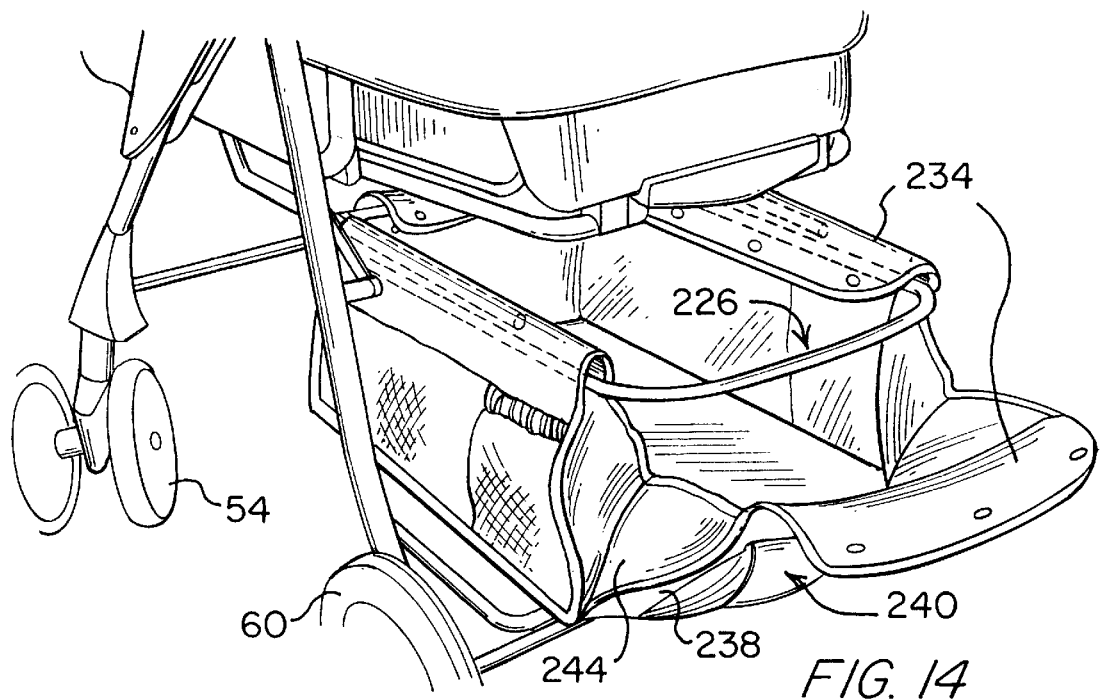
FIG. 14 is a rear perspective view of the basket shown in FIG. 13 on the stroller of FIG. 1, showing the basket in an extended configuration.

The pivotable frame 116 also includes a seat back 154 pivotably attached to the pivotable frame base 144, and a pair of lateral side arms 156 which are pivotably connected to the seat back 154, as shown in FIGS. 8 and 10. The lateral side arms 156 have arcuate slots 158 defined at opposite ends thereof from the connection to the seat back 154. The pins 126 extending from the fixed frame 114 are received within the arcuate slots 158 (FIGS. 9 and 11). Thus, the seat back 154 can be folded relative to the pivotable frame base 144 by pivoting the seat back 154 forward so that the lateral side arms 156 slide forward relative to the fixed frame 114 by allowing the pins 126 to move along the arcuate slots 158. At one end of each of the arcuate slots 158 is a region 160 in which the opening defined by the slot 158 is of a relatively-larger width than the remainder 162 of the slot 158. When the pins 126 are in this region 160 of the slots 158, the width of the seat back 154 and the mounting of the lateral side arms 156 will cause the lateral side arms to be positioned on the necks 130 of the annular members 128 so that the lateral side arms 156 cannot be moved relative to the pins 126, because the necks 130 are too large to move into the relatively-narrower width of the remainder 162 of each slot 158. In order to fold the seat back 154, the lateral side arms 156 must be moved slightly inward toward each other, against the bias of the spring 127 on the pin 126, until the pin 126 with its narrower diameter is within the arcuate slot 158. At this point, the lateral side arms 156 may be moved relative to the pins 126 since the remainder 162 of the arcuate slot 158 is of sufficient width to accommodate the relatively-narrower diameter pin 126, but not the neck 130. Without actuating the lateral side arms 156 in this manner, it can be appreciated that after the entire stroller 30 is folded, the seat back 154 will remain in the upright position shown in FIG. 8. The seat back 154 may then be pivoted to the position shown in FIG. 10 by moving the lateral side arms 156 toward each other, as described above, to allow the seat back 154 to be folded to reduce the overall three-dimensional volume or profile of the folded stroller 30, as shown in FIG. 12.

Figure 2:
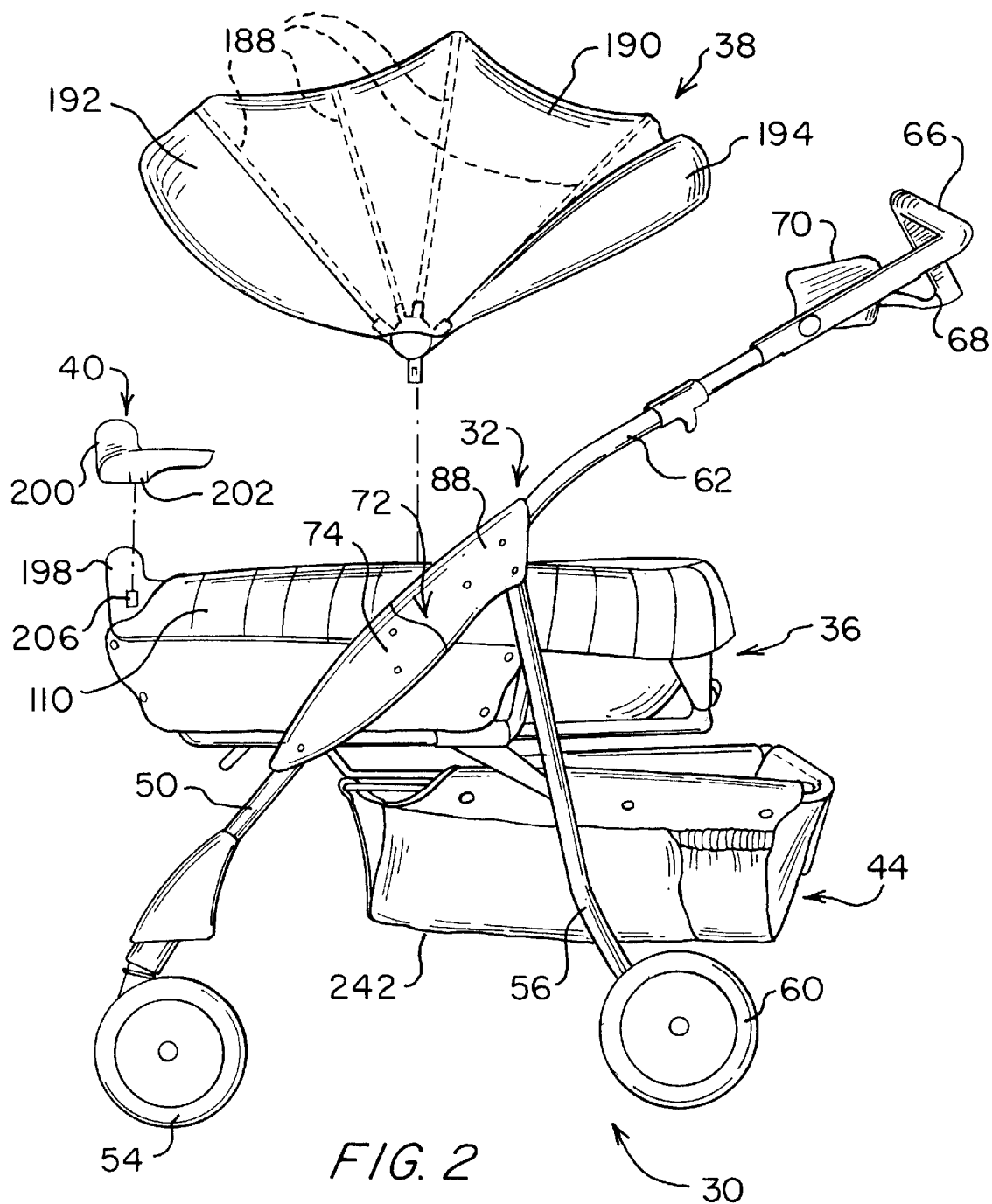
FIG. 2 is a side elevational view of the stroller of FIG. 1, showing a canopy and a article-holding tray exploded therefrom.
Figure 5:
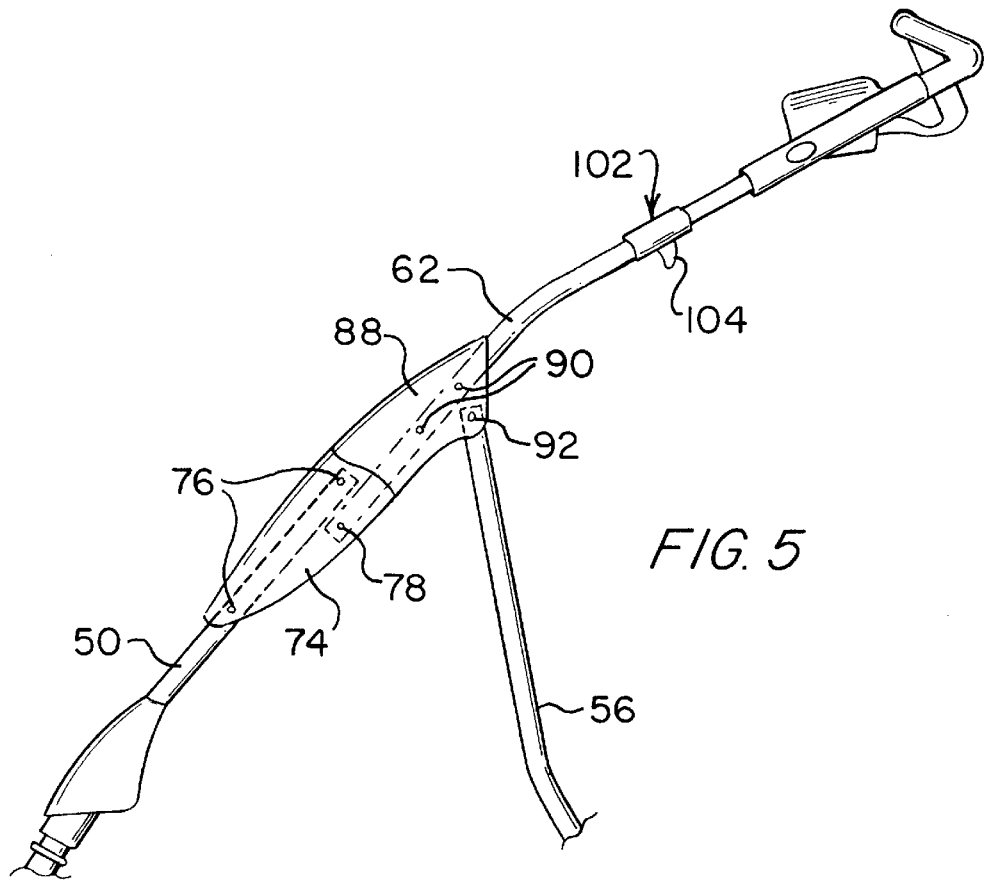
FIG. 5 is a side elevational view of a portion of the frame assembly of the stroller of FIG. 2, showing some of the internal components of a latching mechanism behind a fairing assembly.

As shown best in FIG. 2, the canopy 38 includes a hub assembly 170 having a latching finger 172 extending downwardly therefrom. The latching finger 172 includes a resilient raised surface 174 thereon for engagement with the side opening 125 communicating with the opening 124 in the upper frame member 122. The hub assembly 170 includes five hubs 176, 178, 180, 182, and 184 rotatably connected together. The second hub 178 is affixed to the latching finger 172 and thus is stationary once the canopy 38 is attached to the seat assembly 36. Each of the remaining hubs 176, 180, 182, and 184 have receptacles 186 formed thereon to receive flexible frame support rods 188 attached between the two hub assemblies 170 after threading through a fabric canopy cover 190. The fabric canopy cover may also include a flap 189 for covering the hub assembly 170. The flap 189 is retained in place by an elastic loop 191 which may be looped around the hub assembly 170. Thus, it can be appreciated that, after attachment to the seat assembly 36, the canopy 38 can be folded by moving the support rods 188 toward each other and moving the entire folded canopy 38 toward the front or back of the seat assembly 36. Alternatively, the canopy 38 can be extended by spreading the support rods 188 away from each other by grasping the first and last rod and moving them apart from each other to the position shown in FIG. 2. The canopy 38 can also be placed in an intermediate position such as is shown in the exploded view of FIG. 2, wherein the canopy 38 covers the central portion of the seat assembly 36 and allows air and light to pass in from opposite ends thereof. Alternatively, the canopy 38 may be moved slightly backward to the position shown in FIG. 1, wherein a larger opening is provided at the front of the seat assembly 36 and a relatively small opening is provided at the rear of the seat assembly 36. Alternatively, the canopy 38 may be placed in the fully forward or fully rear positions as desired.

Figure 16:
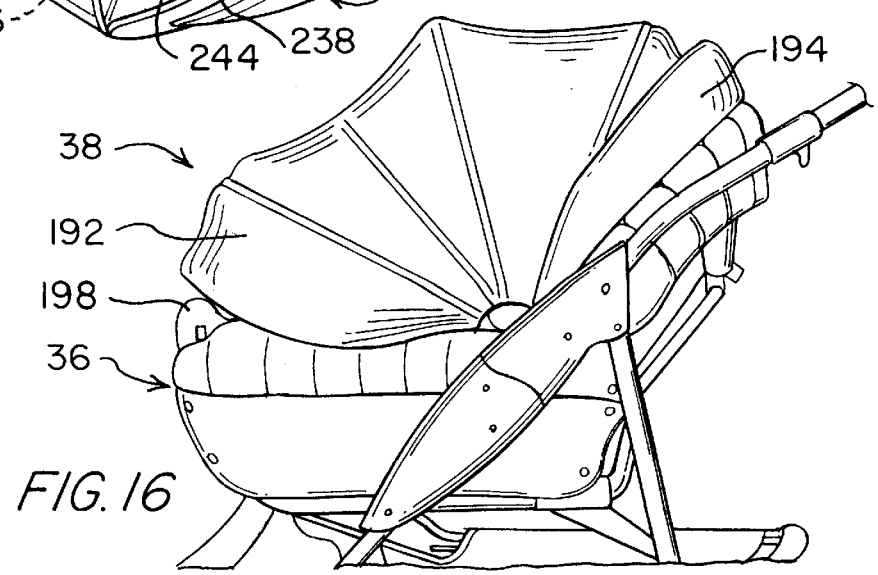
FIG. 16 is a side elevational view of the seating portion of the stroller of FIG. 1, showing the seating portion in an upright seating configuration and with the canopy covering a majority of the seating portion, with a front sunshade visor in an extended position and a rear sunshade visor in a retracted position.
Figure 17:
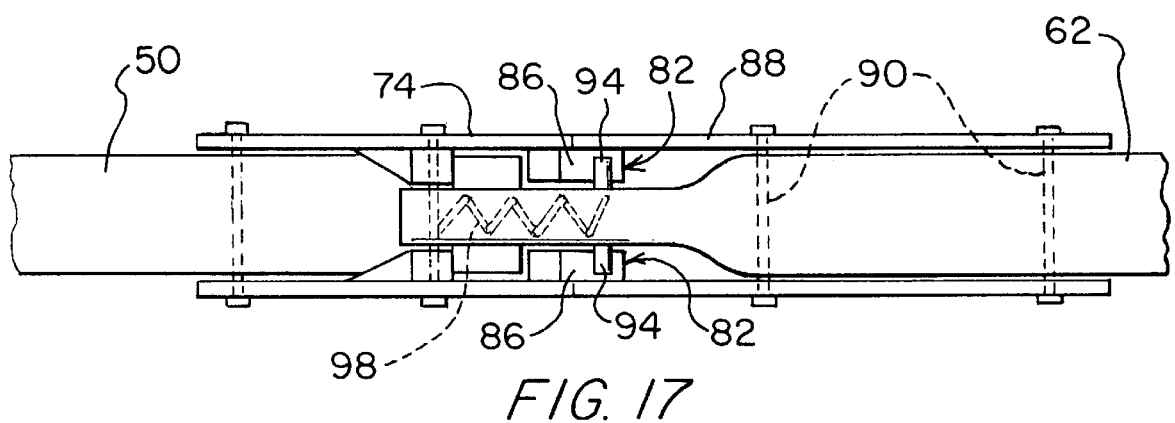
FIG. 17 is a bottom view of the latching mechanism of FIG. 7.

In addition, at each of the front and back edges of the canopy 38 is a flexible, extendable fabric visor 192 and 194, as shown in FIGS. 1, 2, and 16. The visors 192 and 194 can be folded back over the canopy 38 by folding the fabric of each visor back over the adjacent support rod 188. Alternatively, the visors 192 and 194 may be extended by unfolding the fabric of the visor from laying alongside the fabric canopy cover 190 and extending it therefrom. It is possible to place any combination of the visors 192 and 194 in the retracted or extended positions. The dual extendable visors 192 and 194 allow for increased protection from sun, wind, and other elements while providing for ventilation as desired underneath the canopy 38.

Figure 4:
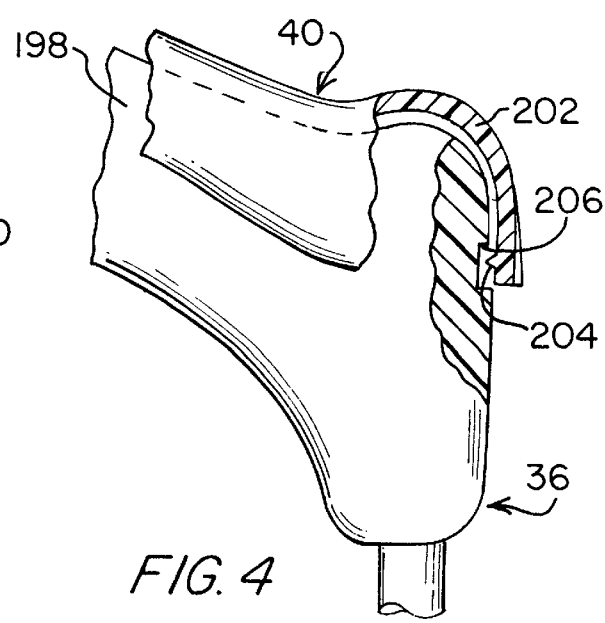
FIG. 4 is an enlarged, partially cut-away and sectional view of the attachment of the article-holding tray to a front edge of a seating portion of the stroller of FIG. 2.

As shown in FIGS. 1, 2, and 4, the tray 40 is attachable to a front edge 198 of the seat assembly 36. The tray 40 is preferably composed of molded plastic and is of unitary construction. The tray includes a front feature 200 which is shaped to fit over the bowed front edge 198 of the seat assembly 36. The tray 40 also includes a pair of latching fingers 202 on opposite lateral sides thereof which have protruding members 204 defined thereon to mate with cut-out features 206 defined in outer sides of the seat assembly 36, as shown in FIGS. 2 and 4. The tray 40 also includes a play surface 208 defined on a top side thereof for supporting toys, food, or other assorted items for the infant's pleasure or as needed.

Figure 18:
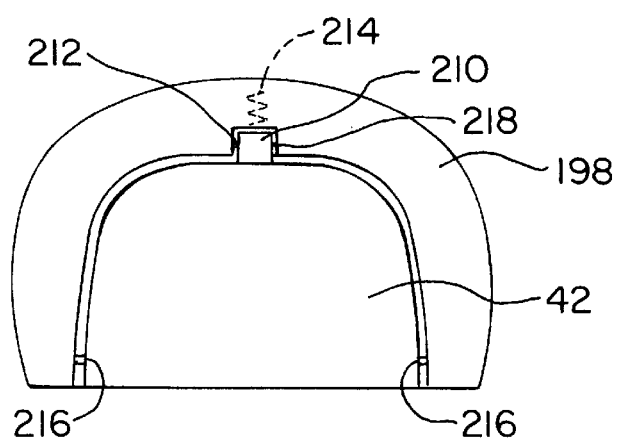
FIG. 18 is a front elevational view of the seating portion of the stroller of FIG. 1, showing a footrest thereon in a retracted position.

The footrest 42 is pivotably attached via pins 216 to a lower front edge of the seat assembly 36, as shown in FIG. 18. The footrest 42 can be pivoted up toward the bowed upper front edge 198 of the seat assembly 36 to better enclose the seating portion of the seat assembly 36. A button 210 is received and pivotably mounted with a pin 218 within a slot 212 defined in the bowed upper front edge 198 of the seat assembly 36. The button 210 can be pivoted to move upward against the force of a spring 214. When the button 210 is in the fully extended position into which the spring 214 biases the button 210, the button 210 will engage with the footrest 42 to hold the footrest into this retracted position. When it is desired to extend the footrest 42, the button 210 can be pushed (pivoted) upward by the operator against the force of the spring 214, until the footrest 42 falls under the force of gravity down to its extended position as shown in FIG. 1.

As shown in FIGS. 2, 13, 14, and 15, the storage basket assembly 44 includes a basket frame 220 and a soft-sided fabric basket 222 suspended therefrom. The basket frame 220 includes a fixed frame member 224 affixed to the underside of the seat assembly 36, and a slidable frame member 226 having a pair of slide collars 228 on either side thereof for slidable engagement with the fixed frame member 224. Thus, it can be appreciated that the slidable frame member 226 can be slid approximately six to eight inches backward toward an extended position relative to the fixed frame member 224. The fabric basket 222 includes two lateral side panels 230 and a front panel 232 stitched therebetween. Each of the lateral side panels 230 and front panel 232 include an upper panel flap 234 formed thereon with releasable fasteners on either side thereof so that the upper panel flap 234 may be looped over the front and lateral sides of the basket frame 220 and reattached thereto by releasable fasteners. The fabric basket 222 also includes a back panel 238 having an upper panel flap 234 defined thereon for looping over a rear portion of the slidable frame member 226 and reattachment thereto with releasable fasteners. The back panel 238 features a pocket 240 stitched on an outer side thereof for convenience and use by the operator of the stroller 30. The back panel 238 is stitched along a bottom edge thereof to a bottom panel 242 which is also stitched to the side panels 230 and front panel 232. Preferably, the bottom panel 242 may be reinforced in some manner to provide for a flat surface on the bottom of the fabric basket 222 and also to provide some weight to cause the fabric basket 222 to remain in a reasonably box-shaped configuration. The back panel 238 is attached to the adjacent lateral side panels 230 by a respective pair of triangular panels 244. The triangular panels 244 are seen in the extended configuration in FIGS. 2, 14, and 15 and in a folded configuration when the storage basket assembly 44 is retracted in FIG. 13. Preferably, the triangular panels 244 may be biased to fold inward by the stitching of the triangular panels 244 to the lateral side panels 230 and back panel 238. In addition, the triangular panels are substantially prevented from crumpling by a stiffening member 246 therein composed of a sheet of polyboard. Together, the stitching and the stiffening member 246 serve to bias the triangular panels 244 toward the interior of the fabric basket 222 when in the retracted position.

Figure 15:
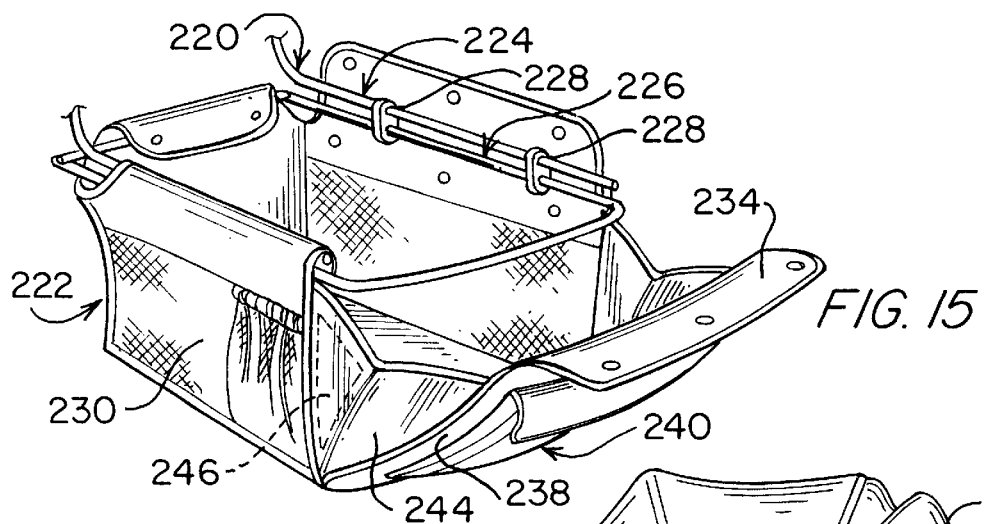
FIG. 15 is a view similar to FIG. 13, showing the basket in a retracted configuration and with a rear panel detached from the frame.

It can be appreciated that the fabric basket 222 can be slid into a retracted position underneath the seat assembly 36 as shown in FIG. 1, or it can be pulled toward an extended position in which at least a portion of the fabric basket 222 extends out from beneath the seat assembly (as shown in FIG. 2) by pulling out the slidable frame member 226. Importantly, the fabric basket remains in an operational configuration (not collapsed) in each of these positions so that various and sundry items can be contained therein at all times. In addition, the fabric basket 222 can be placed in a hatchback orientation, to increase the accessibility of the fabric basket 222, by detaching the upper panel flap 234 of the back panel 238 from the slidable frame member 226 as shown in FIG. 15. The fabric basket 222 can be placed in this hatchback configuration at any position of the slidable frame member 226, including the retracted position or the extended position. The hatchback orientation not only increases the accessibility of the basket 222, it also allows the basket 222 to be used for oversize objects which can extend out of the hatchback.

Figure 19:
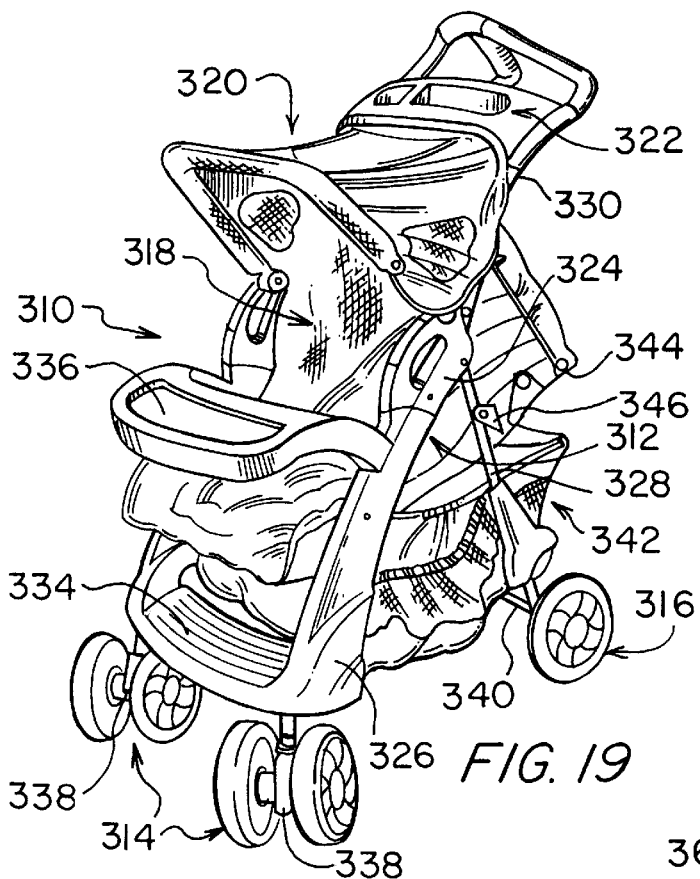
FIG. 19 is a perspective view of a second embodiment of a stroller of the present invention.
Figure 21:
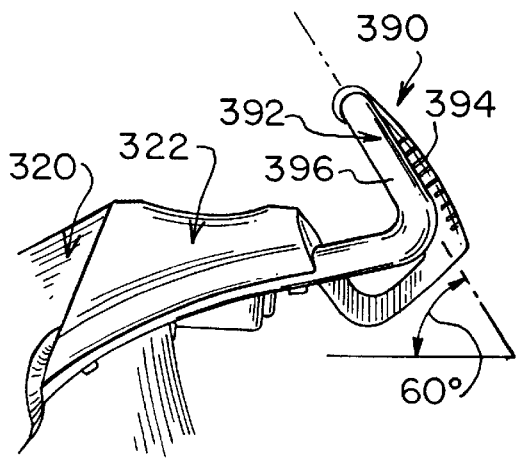
FIG. 21 is a side view of the handle portion of the stroller of FIG. 19.

A second embodiment with many similar features will now be described. An improved convenience stroller 310 adapted for carrying and transporting an infant (not shown) across support surfaces such as floors, sidewalks, streets, and any other suitable terrain is shown in FIG. 19. The stroller 310 includes a frame 312 which is supported by four sets of wheels, two swiveled front sets of wheels 314 and a pair of rear wheels 316. An infant support or seat 318 is attached to the frame 312 for supporting the infant. A canopy 320 and a console tray 322 are also attached to the frame 312 above the seat 318.

The frame 312 is collapsible in the manner which is customary for convenience strollers. Located on each side of the frame is a latch mechanism 324 to which a front leg 326, a rear leg 328, and a handle arm 330 each connect. The latch mechanism 324 is mounted on a lower end of the handle arm 330 to selectively hold or release the front leg 326, rear leg 328, and handle arm 330 in a fixed position relative to each other. The latch mechanism 324 has a push button 332 which, when actuated, releases the latch from the front leg 326 and thus allows the front leg 326 to be pivoted relative to the handle arm 330 in a direction that collapses the stroller 310. The pivoting action occurs about an axis at a lower end of the latch mechanism 324.

The rear leg 328 is pivotably connected at an upper end thereof to an upper end of the latch mechanism 324. The pivotable connection is such that the rear leg 328 can only pivot a fixed amount and thus the rear leg 328 will remain spaced apart from the front leg 326 when the latch mechanism 324 is latched to the front leg 326, retaining the stroller 310 in an open or non-collapsed position.

The two front legs 326, one on each of the right and left sides of the stroller 310, are connected together by a footboard 334. An infant tray 336 may also be connected to the front legs 326, the infant tray 336 being placed in front of the infant to support toys (not shown) or other objects as desired. The front set of wheels 314 on each of the right and left sides of the stroller 310 is connected by a castor 338 to the lower end of each of the front legs 326. The rear wheels 316 are each mounted on a rear axle 340 which is connected between lower ends of the rear legs 328.

Figure 20:
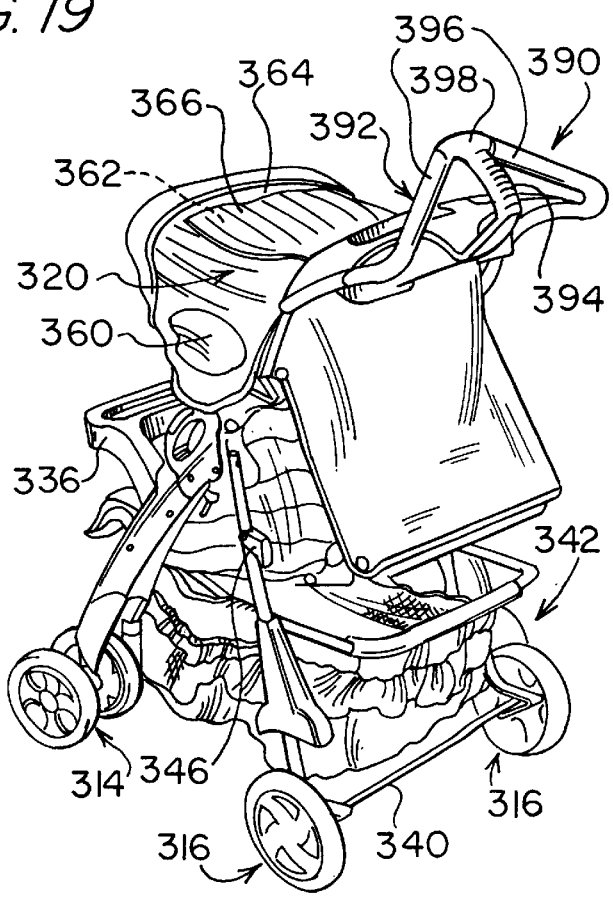
FIG. 20 is a perspective view of the stroller of FIG. 19, showing a back portion thereof, and particularly a handle portion of the stroller.
Figure 22:
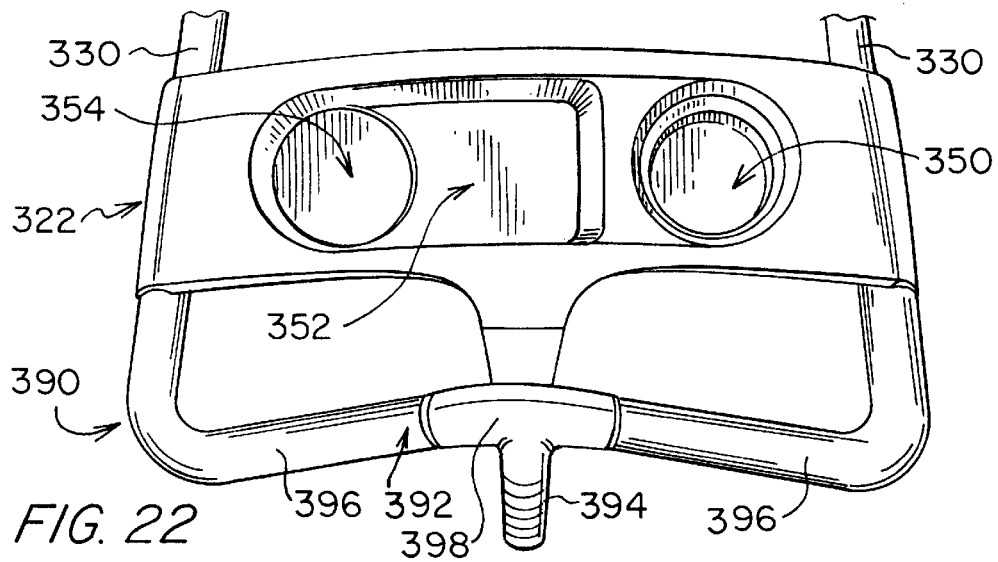
FIG. 22 is an enlarged top view of the handle portion shown in FIG. 21.
Figure 23:
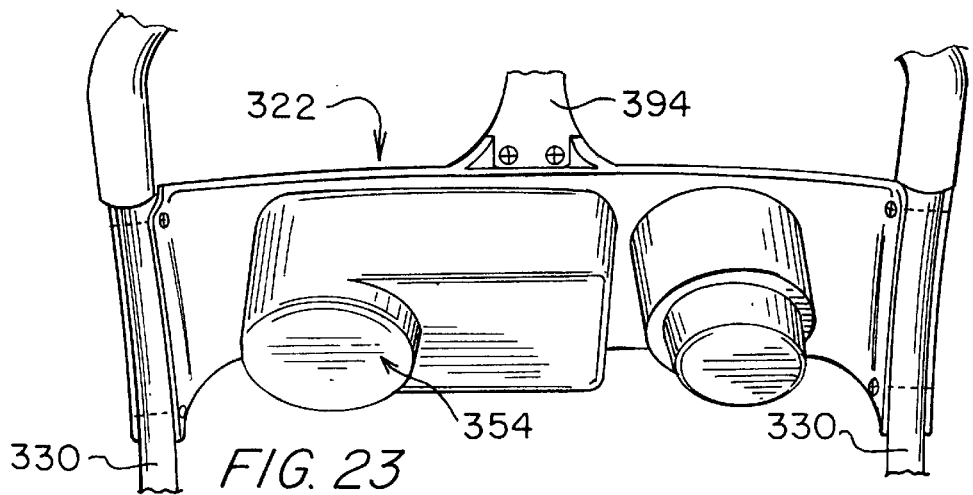
FIG. 23 is an enlarged rear perspective view of a console tray connected to the handle portion of the stroller of FIG. 19.

A lower storage basket 342 is slidably connected in the fashion of a drawer to the front legs 326 and rear legs 328 of the stroller 310. The basket 342 may be selectively slid into its storage position, as shown in FIG. 20, or drawn toward its extended position (not shown) which protrudes from the rear of the stroller 310.

The seat 318 is conventional in construction, including fabric panels which are stitched together and attached to the stroller 310 along the front legs 326 and handle arms 330. The seat 318 also includes a reinforced back rest 344 which can be placed into an upright position (not shown) substantially in alignment with the handle arms 330 or into an inclined position, as shown in FIGS. 19 and 20. A back rest latch mechanism 346 is provided on the seat 318 and handle arm 330 for selectively latching the seat 318 into the upright position.

The elongated console tray 322, best seen in FIGS. 22–25, is attached at opposite ends thereof to the right and left handle arms 330. The console tray 322 includes a pair of molded compartments defined therein. The first molded compartment 350 is suitable for holding a beverage container (not shown) while the second molded compartment 352 is suitable for holding larger items such as a small purse, etc. (not shown). Defined in the bottom of the second molded compartment 352, is a depression 354 which may also serve to hold a beverage container.

The canopy 320 is preferably composed of fabric material with mesh side portions 360 which are provided to allow more light and fresh air into the area between the seat 318 and canopy 320, where the infant will be located. The canopy 320 also includes an upper window 362 on a top side thereof 364 which is provided with a selectively retractable window covering 366 which can be used to cover the windows 362. The canopy 320 is supported along a back edge thereof by attachment to the console tray 322. The canopy 320 is supported along side edges thereof by attachment to the right and left handle arms 330. The canopy is supported along a front edge thereof by attachment to a canopy support frame bar 368. The canopy support frame bar 368 is pivotably mounted to the latch mechanism 324. The pivotable nature of the mounting allows the canopy support frame bar 368 to be pivoted to a fully retracted position where the canopy support frame bar 368 is substantially aligned with the handle arms 330. In this position, the canopy 320 is fully retracted and is not operational to protect the infant in the seat 318. The canopy support frame bar 368 can be pivoted through a plurality of intermediate positions to a fully extended position, as shown in FIGS. 19, 20, and 24–27, where the canopy is fully extended and does serve to protect the infant in the seat 318 below from adverse elements.

A sunshade 380 depends from the front edge of the canopy 320 and is supported from above by attachment to the canopy support frame bar 368, as shown in FIG. 25. The sunshade 380 is selectively supported from below by attachment to a sunshade support frame bar 382. The sunshade support frame bar 382 is pivotably mounted to the latch mechanism 324 adjacent the pivotable mounting of the canopy support frame bar 368, so that the two pivotable mountings provide for pivoting about the same axis. The sunshade support frame bar 382 can be pivoted independently of the canopy support frame bar 368. The sunshade support frame bar 382 is shown in the fully extended position (relative to the canopy support frame bar 368) in FIGS. 25 and 26 and in a retracted position (relative to the canopy support frame bar 368) in FIGS. 19, 20, 24 and 27. Because of the attachment of the sunshade 380 to each of the canopy support frame bar 368 and sunshade support frame bar 382, sufficient movement of either of the frame bars 368 and 382 will eventually pull the other of the frame bars 368 and 382 in the same direction.

Figure 24:
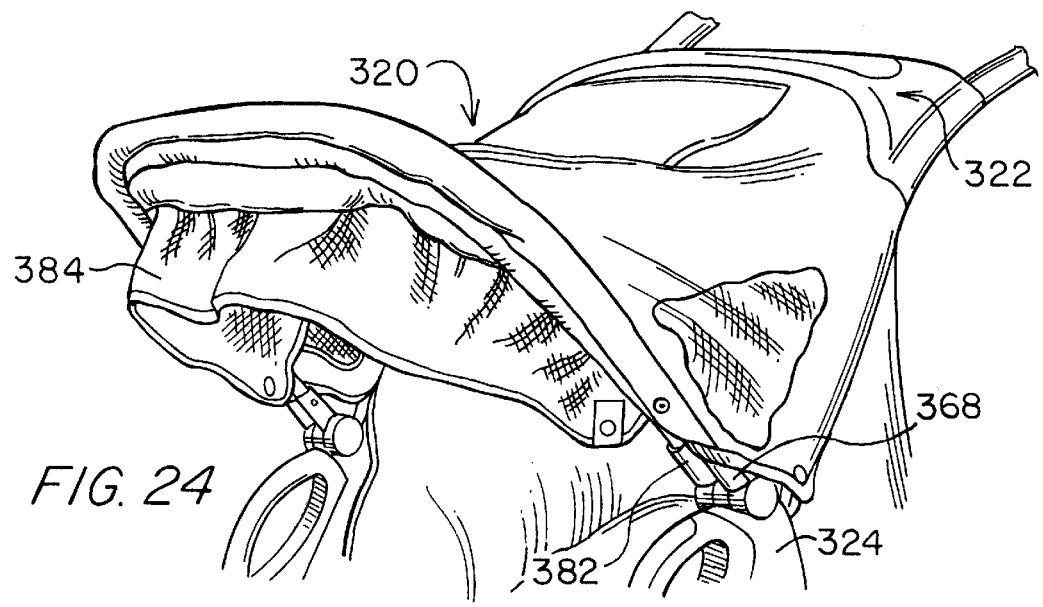
FIG. 24 is an enlarged perspective view of a canopy on the stroller of FIG. 19.

As can be seen in FIGS. 19 and 24, the sunshade 380 can be held in its fully retracted position by a sunshade cover flap 384 which is attached to and depends downwardly from the canopy support frame bar 368. The sunshade cover 384 is provided with portions of snap closures at either ends thereof which selectively can be matingly engaged with matching portions of snap closures mounted on the canopy support frame bar 368. The sunshade cover 384 is shown in a covering position in FIG. 19 and in an uncovered position in FIG. 24.

The pivotable mounting of the sunshade support frame bar 382 and the canopy support frame bar 368 to the latch mechanism 324 are detented systems in which detents are provided at the fully extended and fully retracted positions as well as at a plurality of intermediate positions. Thus, due to the detents, the sunshade support frame bar 382 will initially remain in the fully retracted position when the sunshade cover 384 is removed, as shown in FIG. 24. The sunshade support frame bar 382 may then be manually pulled out of the retracted position and toward the fully extended position, as shown in FIG. 25.

A multi-part handle assembly 390 is formed at upper ends of the handle arms 330. The handle assembly 390 includes an ergonomically-shaped handle bar portion 392 and an elongated handle grip portion 394 depending downwardly therefrom. The handle bar portion 392 includes two symmetrical sides 396 to the handle bar portion 392, forming an inverted and flattened "V" shape. The symmetrical sides 396 join together at an apex 398 on the handle assembly 390 which is coincident with the point where the handle grip portion 394 depends downwardly therefrom. The handle grip portion 394 and the apex 398 are centrally located relative to the handle assembly 390 as seen from above in FIG. 22. Further, the handle grip portion 394 is substantially within a vertical plane of symmetry which bisects the stroller 310, and in which plane lies a longitudinal axis to the stroller 310. Of course, the plane of symmetry is not an exact plane of symmetry as certain details on the left-hand side of the stroller are not identically replicated on the right-hand side as is illustrated by the variations in the compartments 350 and 352 on the console tray 322. Since the plane of symmetry bisects the front sets of wheels 314 from each other and bisects the rear axle 340, the handle grip portion 394 is well located relative to all the wheels 314 and 316 to be able to push the stroller 310 in a straight-forward direction and maneuver the stroller 310 as desired.

The handle grip portion 394 is attached at a bottom end thereof to a central portion of the console tray 322. The handle grip portion 394 is formed along a longitudinal axis which is at an angle relative to horizontal which is ergonomically comfortable. The longitudinal axis of the handle grip portion 394 is preferably at an angle closer to vertical than to horizontal and thus at an angle from horizontal between 45 degrees and 90 degrees. More precisely, this angle is preferably in the range of 60 degrees.

As can be appreciated, for two-handed operation of the stroller 310, the operator can place his/her hands on the handle bar portion 392, one hand on each of the symmetrical sides 396. For one-handed operation, the operator can place either hand on the handle grip portion 394 of the handle assembly 390. Because of the ergonomically comfortable and relatively strong grip position provided by the angle of the handle grip portion 394, the operator can push the stroller 310 and maneuver it as necessary as well as compensate for any instability that may occur due to the pivotable nature of the front sets of wheels 314.

The foregoing description is considered as illustrative only of the principles of the invention. Furthermore, since numerous modifications and changes will readily occur to those skilled in the art, it is not desired to limit the invention to the exact construction and process shown as described above. For example, each of the concepts expressed herein can apply equally well to carriage strollers and those convertible to carriage strollers as well as those strollers, known as convenience strollers, which do not convert into carriages. Accordingly, all suitable modifications and equivalents may be resorted to falling within the scope of the invention as defined by the claims which follow.

The invention claimed is:

1. A stroller for transporting children along generally horizontal surfaces, comprising:
    a support frame including a seating assembly;
    a plurality of wheels mountable on the support frame; and
    a basket assembly separate and distinct from the seating assembly, the basket assembly including:
        a slidable basket frame having:
            a fixed frame portion mounted on the support frame, the fixed frame portion including a pair of elongated, parallel rods, each rod being attached at one end to the support frame and unattached at an opposite end;
            a slidable frame portion slidably attached to the fixed frame portion, the slidable frame portion being movable between a retracted position substantially underneath the seating assembly and an extended position in which the slidable frame portion has at least a portion which extends out from underneath the seating assembly, the slidable frame portion having four elongated rods joined together to form a substantially rectangular shape, with a front and rear rod being substantially parallel to each other and a pair of side rods being substantially parallel to each other; and
            a first pair of slide collars slidably attaching one of the rods of the fixed frame portion to one of the side rods of the slidable frame portion and a second pair of slide collars slidably attaching the other of the rods of the fixed frame portion to the other of the side rods of the slidable frame portion, wherein each slide collar includes a pair of parallel, cylindrical bores defined therein, with one of the bores receiving one of the rods of the fixed frame portion and the other of the bores receiving one of the side rods of the slidable frame portion; and
        a flexible basket suspended from the slidable frame portion to allow the basket to slide in and out relative to the support frame between a retracted position and an extended position in which the fabric basket is in an operational configuration for use in storing articles in each of the retracted and extended positions, wherein the flexible basket includes a plurality of side panels which are attachable to the basket frame, each of the side panels having a top edge, wherein a rear side panel is attached to the adjacent side panels by flexible support members to allow the top edge of the rear side panel to be selectively separated from the top edges of the adjacent side panels when the slidable basket frame is in any position between and including the retracted and extended positions to provide access to the interior of the basket through the rear side thereof via an opening at least partially defined by the top edge of the rear side panel and the support members,
        wherein the flexible support members include a pair of triangular fabric panels attached to each other along first edges thereof and attached to side edges of the side panels of the flexible basket along second edges of the triangular fabric panels, wherein at least one of the triangular fabric panels includes a stiffening member therein, wherein each of the side panels of the flexible basket includes a flap defined proximate to an upper edge thereof, the flap being extendable around a corresponding one of the rods of the slidable basket frame, and the flap being attachable to the side panel to allow the panel to be attached to and suspended from the corresponding rod of the slidable basket frame, wherein the flaps on the side panels of the flexible basket corresponding to lateral sides of the basket assembly are also extendable around the corresponding rod of the fixed frame portion.

2. A stroller as defined in claim 1, wherein the fixed frame portion is mounted on the seating assembly.

3. A stroller for transporting children along generally horizontal surfaces, comprising:

a support frame having a pair of upper side edges with receptacles defined therein, the receptacles having latching surfaces formed thereon;

a plurality of wheels mountable on the support frame; and a canopy attachable to the support frame, wherein the canopy includes a canopy frame attachable to the support frame via the receptacles and a canopy fabric attached to the canopy frame, the canopy frame including a plurality of U-shaped ribs pivotably linked together along a common axis at opposite ends thereof at a multiple-membered pivotable hub assembly to allow the canopy frame to be moved between an extended position where the ribs are pivoted to spaced-apart positions relative to each other and a retracted position where the ribs are aligned with each other, wherein the canopy fabric is attached at spaced-apart positions on the canopy fabric to the plurality of ribs of the canopy frame to allow the canopy fabric to be stretched into an extended position when the canopy frame is moved to its extended position, wherein the canopy further includes a frameless front visor attached thereto along a front edge of the canopy and a frameless rear visor attached to the canopy along a rear edge of the canopy, wherein each of the front and rear visors are selectively movable between an extended position and a retracted position, and wherein the pivotable hub assembly includes an extended finger protruding downward therefrom for insertion into a corresponding one of the receptacles on the upper side edges of the support assembly, the finger having latching surfaces formed thereon for engagement with the latching surfaces on the receptacles, the latching surfaces on the finger including a resilient flap that is provided in a position that slightly protrudes from the outer surface of the finger, the flap being movable from this protruding position to a position along the outer surface of the finger when the flap is forced toward the surface of the finger by insertion of the finger into the receptacle, and the flap moving back toward the protruding position due to the resilient nature of the flap when the flap is no longer forced toward the surface of the finger, to allow for selectively and removably attaching the canopy to the support frame.

4. A stroller as defined in claim 3, wherein the front and rear visors are composed of fabric.

5. A stroller as defined in claim 3, wherein the retracted position for the front and rear visors includes the visors being folded back to lay flat against the canopy fabric.

6. A stroller for transporting children along generally horizontal surfaces, comprising:

a foldable support frame that is foldable between an operational configuration and a collapsed configuration;

a plurality of wheels mountable on the support frame; and a bed/seat assembly attachable to the support frame, the bed/seat assembly having a forward, fixed portion thereof that is fixed relative to the support frame when the support frame is in the operational configuration and a rear, movable portion pivotably attached to the fixed portion to allow the bed/seat assembly to be placed in one of a plurality of orientations including a bassinet orientation in which the movable portion is generally parallel to and aligned with the fixed portion, and a seating orientation in which the movable portion is pivoted to an angle relative to the fixed portion where the movable portion is generally at an intersecting angle to the fixed portion, the fixed portion having a lower frame portion and an upper frame portion, the movable portion having a lower frame portion and an upper frame portion, with the lower frame portions of the fixed portion and the movable portion being pivotably coupled together and the upper frame portions of the fixed portion and the movable portion being slidably coupled together, the movable portion having a rear wall which is pivotably attached thereto and which interconnects the lower frame portion of the movable portion to the upper frame portion of the movable portion, and can be folded forward toward the fixed portion from an upright position to a collapsed and folded position relative to the remainder of the movable portion for a reduced profile when the support frame is folded into the collapsed configuration, while also providing a barrier to substantially prevent ingress and egress through the rear wall while the seat assembly is in the bassinet orientation.

7. A stroller as defined in claim 6, wherein the rear wall is attached to the fixed portion via the upper frame portion with lateral side arms pivotably connected to the rear wall and slidably connected to the fixed portion.

8. A stroller as defined in claim 7, wherein one of the fixed portion and the lateral side members includes a slot defined therein and the other of the fixed portion and the lateral side members includes a pin attached thereto for slidable engagement by the slot.

9. A stroller as defined in claim 8, wherein the pin and slot include surfaces thereon that substantially prevent the rear wall from being folded when in the upright position until one of the pin and slot is moved relative to the other in a direction parallel to the longitudinal axis of the pin to allow the pin to be slid along the slot so that the rear wall can be folded.

10. A stroller for transporting children along generally horizontal surfaces, comprising:

a support frame;

a plurality of wheels mountable on the support frame;

a seating portion mounted on the support frame, the seating portion including two generally-horizontal side barriers and a front barrier bridging across the seating portion between the two side barriers, the front barrier having an upper shape thereto, the two side barriers having latching surfaces defined thereon on lateral outer sides thereof, the seating portion having a forward fixed portion that includes the front barrier and the two side barriers and the seating portion having a rear pivotable portion to allow the seating portion to be placed into a bassinet orientation when the rear portion is pivoted to a lower position and into an upright seating orientation when the rear portion is pivoted to an upper position; and an article-receiving tray having a lower surface corresponding to and mating with the upper shape of the front barrier, the tray being selectively attachable to and detachable from the seating portion, by mating with and being supported across the entire width of the tray by the front barrier and the two side barriers of the seating portion, the tray having latching surfaces defined thereon for releasably engaging the latching surfaces on the two side barriers of the seating portion when the seating portion is in either of the bassinet or upright seating orientations.

11. A stroller as defined in claim 10, wherein one of the seating portion and the tray includes latching fingers provided thereon and the other of the seating portion and the tray includes mating surfaces defined thereon for engagement by the latching fingers.

12. A stroller as defined in claim 11, wherein the latching fingers include resilient fingers with protruding members thereon, and the mating surfaces include notches defined therein for engagement by the protruding members of the resilient fingers.

* * * * *